March 9, 1965 A. SHAINES 3,172,775

METHOD OF COATING RESIN ON CERAMIC

Filed July 22, 1960

BASE MEMBER

CERAMIC ON BASE MEMBER

PLASTIC IMPREGNATED INTO BASE MEMBER

INVENTOR.
ALFRED SHAINES
BY
his ATTORNEY

United States Patent Office 3,172,775
Patented Mar. 9, 1965

3,172,775
METHOD OF COATING RESIN ON CERAMIC
Alfred Shaines, Fanwood, N.J., assignor to American Radiator & Standard Sanitary Corporation, New York, N.Y., a corporation of Delaware
Filed July 22, 1960, Ser. No. 44,756
2 Claims. (Cl. 117—68)

The present invention relates to a method for coating ceramics on plastics and to a plastic article having a ceramic coating.

Plastics have been used for an increasing number of articles and their application has recently been expanded by using plastics in conjunction with other substances. By making a composite material which offers the advantages both of plastics and of the other substances utilized, a variety of products with a wide range of useful properties is made possible.

An example of this is coating of ceramics on plastics. Plastics have many desirable properties, such as light weight, but they also have some drawbacks which make them unsuitable in certain applications. For example, they are easily scratched and deformed and they offer poor resistance to heat and humidity as well as to many chemicals. By coating a layer of ceramics on a plastic, composite structures might be obtained which would combine the light weight and structural properties of plastics with the ornamental beauty and comparative durability of ceramics. Such composite materials could be used in a variety of applications such as sanitary fixtures, wall tiles, water tanks, etc.

In the past, smooth, non-porous, vitreous coatings of ceramics on plastics have been difficult or impossible to achieve. The plastic substrate, under the usual coating procedure, must be able to withstand relatively high firing temperatures, which may be in the order of 1000° F. or more. No satisfactory plastics exist today which can withstand such high temperatures for any appreciable length of time. While some attempts have been made to coat a ceramic on a plastic by shielding the plastic against exposure to high temperature, as by introducing a layer of glass intermediate the plastic and the ceramic coating, or by "flame-spraying" a ceramic powder onto the plastic, the former process has proved unsatisfactory and the latter has produced only porous, rough surfaces on a few limited types of plastic substrates either because of temperature limitations or poor bonding between the ceramic and the plastic.

The present invention overcomes these disadvantages and has for one of its objects to provide an improved method of applying ceramic coatings to a plastic.

Another object of this invention is to provide an improved ceramic coated plastic article.

A further object of this invention is to provide a ceramic coated plastic article in which the ceramic coating is securely bonded to the plastic and has a smooth outer surface.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Figure 1:
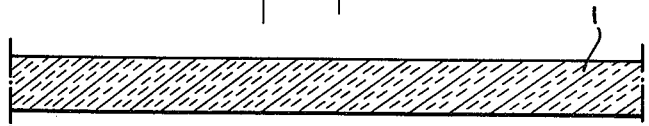
FIG. 1 is a cross-sectional view of a fiber matrix or interface of the type used in the invention.
Figure 2:
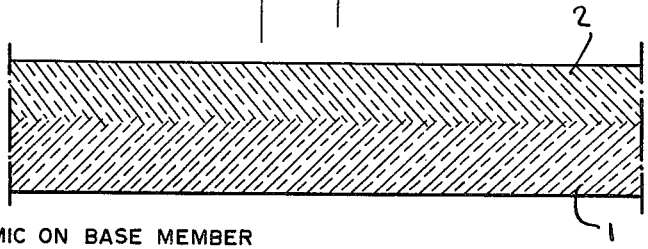
FIG. 2 is a cross-sectional view of the same matrix of FIG. 1 after it has been coated with ceramic frit.
Figure 3:
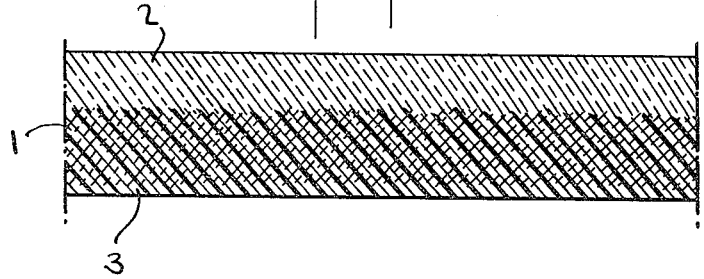
FIG. 3 is a cross-sectional view showing the fiber matrix impregnated with a plastic resin.

In general, the method of making a ceramic coated plastic in accordance with the present invention comprises forming a base or matrix 1 made of a fiber (FIG. 1), such as asbestos, which is capable of withstanding without melting or breakdown the high firing temperatures usually necessary to produce chemically resistant ceramics. One surface of this mineral fiber base or matrix is then coated with a suitable ceramic frit 2, (FIG. 2) usually suspended in an aqueous solution. Thereafter the ceramic frit 2 is first dried and then fired at a suitable temperature. The base or matrix 1 adheres with the ceramic coating 2 which is fused to the matrix 1. The matrix 1 and ceramic coating 2 are allowed to cool and the surface of the mineral fiber base or matrix 1 opposite the surface with the ceramic frit is then impregnated throughout with a suitable plastic resin 3, (FIG. 3) until the plastic resin comes up to the ceramic. The plastic resin 3 may be a thermosetting resin or a thermoplastic resin. If a thermosetting resin is used, it is cured, with the assistance of a suitable catalyst, by heating the resin to its curing temperature (which is usually much lower than the ceramic firing temperature) so that there is a fusing of the plastic resin 3 with the fiber base or matrix 1, whereas if a thermoplastic resin is used, curing is unnecessary since the resin hardens without heating and fuses with the matrix 1. In both cases, a hard, rigid ceramic coated plastic structure is finally produced.

Hence, by this method it is evident that firing and fusing of the ceramic frit 2 may be effected at a temperature much higher than that which any plastic could normally withstand, since the base or matrix 1 only is subjected to a high temperature at the firing stage and the plastic resin 3 is added only after the ceramic 2 has been fired and after the whole structure has cooled considerably.

Considering now the method of the present invention in greater detail, the base or matrix which is used (see FIG. 1) might be made of any suitable impregnable fiber material, such as asbestos, metal or other fibers, which is capable of withstanding firing temperatures of the order of about 1000° F. or higher. It will be understood that it is within the scope of the present invention to use ceramic frits having lower firing temperatures and that, in that event, impregnable material may be used which is only able to withstand the firing i.e., fusing, temperature of the particular ceramic frit which is utilized.

Asbestos is one material which may be used for the base. Several types of asbestos may be used for the matrix or base; for example, chrysotile, a common insulation asbestos, containing about 13 percent of water of hydration, amosite which contains 1 to 5 percent water, or crocidolite containing about 1 percent water. On heating to firing i.e., fusing, temperatures in excess of 1000° F., these materials give up this water and undergo a noticeable change in physical properties. Chrysotile becomes light and fluffy while amosite or crocidolite become "harder" and less resilient.

One ceramic frit which is particularly effective is aluminum enamel which can be fired, i.e., fused, at about 1000° F., but other types of ceramic frits having higher or lower firing temperatures may also be used. As stated above, the plastic resin which is utilized may be either a thermosetting resin or a thermoplastic resin, each of which may be selected from a large, diversified group. Among the thermosetting resins which may be used are polyesters prepared from either phthalic or maleic acid, diallyl phthalate, polyurethane, etc. Some thermoplastic resins which may be used are nylon, polystyrene, polyvinyl chloride, etc. A catalyst such as benzoyl peroxide may be utilized to hasten the curing process where a thermosetting plastic is used.

The following examples show two ways in which the method can be performed in specific applications, but it will be understood, of course, that the present invention is not limited to the two illustrations described below.

*Example I*

About 25 grams of North American Asbestos Corporation Amosite G asbestos fiber is slurried in about 1,000 grams of water by means of a Hobart Mixer. The slurry is filtered through a 91 mm. laboratory Büchner funnel and placed in an air circulating oven overnight at 200° F. This is used as the base or matrix. The weight of the dried matrix is about 24 gms. One surface of the matrix is then spray-coated with an aluminum enamel after a small rectangular piece of sheet metal, 2″ x ¾″ x 0.019″, has been placed in it. The matrix is put into a Lindberg muffle furnace maintained at 1050° F. After 10 minutes, during which the enamel is fused to the matrix, the furnace heat is shut off and the matrix allowed to remain in the furnace overnight cooling slowly to room temperature. The weight of the enameled matrix with the metal "insert" is about 36 gms.

125 gms. of diallyl phthalate monomer is heated to 200° F. and put into a paper cup placed in a glass "resin kettle." A small horseshoe magnet is wired to the end of a glass rod and the rod put through a stopper in the lid of the kettle. The matrix is suspended above the cup containing the diallyl phthalate by the attraction of the magnet on the small piece of metal on the matrix. A vacuum is drawn on the kettle and the matrix pushed into the cup containing the resin. The vacuum is then released forcing the resin into the evacuated pores of the matrix. The impregnated matrix is heated in an air circulating oven at 350° F. for 6 hours, 50 minutes to cure the diallyl phthalate monomer. Benzoyl peroxide is used as a catalyst, to hasten the curing process. The resultant ceramic coated asbestos reinforced polyester weighs about 113 gms.

*Example II*

About 25 grams of North American Asbestos Corporation Crocidolite H–X is mixed up in about 980 grams of water, using a Hobart Mixer. The mixture is filtered through a 91 mm. laboratory Büchner funnel and placed to dry in an air circulating oven maintained at 375° F. Drying is effected for about a half hour until the mixture weighs about 25 grams. It is then used as the base or matrix.

The matrix is sprayed with an aluminum enamel and left to dry several hours. A piece of sheet metal is placed in the center of the wet enamel and is to be used to suspend the matrix in a vacuum kettle. In order to fire or fuse the enamel, the matrix is placed in a Lindberg muffle furnace maintained at about 1050° F. for about 10 minutes. The furnace is then shut down and the matrix is allowed to cool to room temperature. The weight of the enameled matrix with the piece of sheet metal bonded to the surface is then approximately 43 grams.

For the resinous plastic component, about 110 grams of diallyl phthalate monomer are heated to 200° F. and put into a paper cup placed in a glass "resin kettle." A horseshoe magnet is wired to the end of a glass rod, and the rod is put through a stopper in the lid of the kettle. The matrix is suspended above the cup containing the diallyl phthalate by means of the attraction of the piece of metal in the matrix to the magnet. A vacuum is drawn on the kettle, and the matrix is pushed into the cup containing the resin, so that the matrix becomes impregnated with the resin.

For curing, the matrix is placed in an oven at 240° F. for 105 minutes. Benzoyl peroxide is used as a catalyst to hasten the curing process. It is then taken out and left at room temperature for about 68 hours. After this, it is placed in an oven maintained at 350° F. for 45 minutes, and at 250° F. for 45 minutes, after which time it is removed.

In both of the above examples the resultant product has a smooth ceramic coating bonded securely to an underlying plastic.

It will be seen that the present invention provides an improved method for forming ceramic coated plastic materials which have a smooth surface and a secure bond between the ceramic coating and the underlying plastic.

As various changes may be made in the form, construction and arrangement of the parts herein without departing from the spirit and scope of the invention and without sacrificing any of the advantages herein, it is to be understood that all matter herein is to be interpreted as illustrative and not in a limiting sense.

Having thus described my invention, I claim:

1. The method of bonding ceramic and plastic materials into a unified member comprising the steps of forming an impregnable base from a substance capable of withstanding the fusing temperature of ceramics, coating a first major surface of said base with a ceramic frit firing said ceramic frit at its liquidus temperature fusing said frit to said base, impregnating an uncured plastic resin material into the opposite major surface of said base and into contact with the ceramic fused to the base, and curing said plastic resin.

2. A method of bonding ceramic and plastic materials into a unified member comprising the steps of forming an impregnable asbestos base, coating a first major surface of said base with an aluminum enamel frit, firing said frit and said base at a temperature of about 1000° F. to fuse said frit to said base, impregnating the opposite major surface of said base with a polyester resin until contact is established with the ceramic surface fused to said base, and curing said resin.

References Cited by the Examiner

UNITED STATES PATENTS

| | | | |
|---|---|---|---|
| 1,628,910 | 5/27 | Prouty et al. | 117—125 |
| 1,879,155 | 9/32 | Fisher | 117—126 |
| 2,372,285 | 3/45 | Marc et al. | 117—126 |
| 2,683,096 | 7/54 | Eckert et al. | 117—126 X |
| 2,734,007 | 2/56 | Toulmin | 50—347 |
| 2,760,881 | 8/56 | Toulmin | 50—413 |
| 2,863,795 | 12/58 | Robitschek | 117—126 X |
| 2,931,751 | 4/60 | Du Fresne | 117—68 X |
| 3,011,988 | 12/61 | Luedke et al. | 117—126 |

FOREIGN PATENTS 547,532   9/42   Great Britain.

RICHARD D. NEVIUS, *Primary Examiner.*